Patented Feb. 17, 1948

2,436,357

UNITED STATES PATENT OFFICE 2,436,357

FLUORINATION OF HEXACHLORO-BUTADIENE

Carl I. Gochenour and Glendon D. Kyker, Niagara Falls, N. Y., assignors to Hooker Electrochemical Company, Niagara Falls, N. Y., a corporation of New York No Drawing. Application May 14, 1945, Serial No. 593,775

7 Claims. (Cl. 260—653)

Our invention relates more particularly to substitution of fluorine for chlorine in hexachlorbutadiene by reaction with antimony pentafluoride, or hydrogen fluoride in presence of a catalyst.

It is known that in presence of a catalyst such as an antimony halide the fluorine of hydrogen flouride readily replaces more or less of the chlorine in the alkyl groups of alicyclic hydrocarbons or attached to primary carbon atoms of saturated acyclic hydrocarbons. It is also known that if the catalyst is an antimony halide the reaction is promoted by presence of free chlorine, under which conditions it is possible to replace with fluorine more or less of the chlorine atoms attached to secondary carbon atoms of saturated acyclic hydrocarbons. It has been found, moreover, that in presence of antimony pentahalide and free chlorine, hydrogen fluoride will react with tetrachlorethylene to produce tetrafluordichlorethane or trifluortrichlorethane. The product is therefore saturated.

We have now found that in presence of antimony pentahalide, and preferably pentachloride, and free chlorine, hydrogen fluoride reacts with hexachlorbutadiene in accordance with the following theoretical reactions:

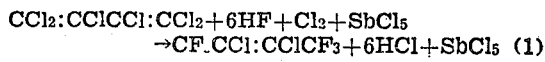

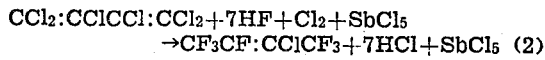

In practice, it is necessary to use an excess of hydrogen fluoride in these reactions, and this displaces some of the chlorine of the catalyst, which is therefore recovered as antimony pentafluorochloride.

In this case the two double bonds of the butadiene are saturated with fluorine and a new double bond is established at the middle or No. 2 position of the molecule, where before there was a single bond, the product being therefore still unsaturated. This is a curious and unpredictable result, entirely unlike that obtained in the fluorination of ethylene.

Example I 70 lbs. of hexachlorbutadiene and 35 lbs. of antimony pentachloride were charged into a ten gallon nickel clad jacketed reactor provided with an agitator, reflux condenser, thermometer well and inlets for vaporized hydrogen fluoride and chlorine, extending to near the bottom of the reactor. The condenser was in two parts, the first water cooled and the second cooled by means of "dry ice," or solid carbon dioxide, in alcohol. In the refluxing pipe connection a bypass was provided leading to a receiver, also cooled by means of Dry Ice. The contents of the reactor were agitated and heated to 40° C., at which temperature vaporized anhydrous HF was passed into the liquid contents of the reactor at the rate of 2½ lbs. per hour, until 12 lbs. had been added. The admission of HF was then discontinued and gaseous chlorine admitted under similar conditions until 10 lbs. of chlorine had been added. The admission of HF and chlorine was continued alternately, by increments of 10 lbs. of each, until a total of 32 lbs. of HF and 20 lbs. of chlorine had been admitted, this being the theoretical quantity of HF necessary to replace four atoms of chlorine per molecule of hexachlorbutadiene with fluorine and saturate the two double bonds with fluorine, and 73 per cent of the theoretical quantity of chlorine necessary to maintain the catalyst in the pentavalent state under the conditions of the reaction. During this process the temperature was maintained at 40° to 60° C. and the low boiling constituents were refluxed back into the reactor.

The above described process having consumed about 20 hours, at its conclusion the temperature of the liquid contents of the reactor was slowly raised to 120° C., during which time the distillate was collected in the receiver. The crude distillate, which weighed 17.5 lbs., was washed free of acid and catalyst and dried and filtered.

The liquid remaining in the reactor was then further treated as follows: With the temperature held at 40° to 60° C., 4.5 lbs. more chlorine were passed into the liquid and then a mixture of chlorine and anhydrous HF was passed into the liquid until a total of 18 lbs. of additional HF and 12.5 lbs. of additional chlorine had been introduced, in a period of 8 hours, with refluxing as before. The temperature was thereupon allowed to rise slowly to 126° C., the distillate being collected in the receiver and washed, dried and filtered as before. From the second treatment 14.3 lbs. of crude distillate were obtained.

The two batches of crude distillate were then rectified separately in a 6 ft. by 1½ inch packed column and the following fractions recovered:

| Boiling Range of Fraction | Fraction, Per Cent of Total | |
|---|---|---|
| | First Distillate | Second Distillate |
| 33°–35° C | 3.64 | 5.90 |
| 35°–66° C | 7.65 | 4.36 |
| 66°–68° C | 58.20 | 58.40 |
| Residue | 30.91 | 31.34 |

These fractions analyzed as follows:

| Boiling Range of Fraction | Analysis of Fraction | |
|---|---|---|
| | Per Cent Fluorine | Per Cent Chlorine |
| 33°–35° C | [1] 54.4 | [2] 21.0 |
| 66°–68° C | [3] 48.6 | [4] 30.9 |

[1] Per cent fluorine in heptafluormonochlorbutene, 61.5.
[2] Per cent chlorine in heptafluormonochlorbutene, 16.4.
[3] Per cent fluorine in hexafluordichlorbutene, 48.9.
[4] Per cent chlorine in hexafluordichlorbutene, 30.9.

These analyses show clearly that the fraction boiling at 66°–68° C. consisted almost exclusively of hexafluordichlorbutene. The fraction boiling at 33°–35° C. was not so sharp a cut, but nevertheless obviously contained a considerable percentage of heptafluormonochlorbutene. The intermediate fraction, boiling at 35° to 66° C., was a mixture of these two products. These can be largely separated and recovered by another fractionation. The residue consisted of partially reacted hexachlorbutadiene. This may be recycled.

The total yields of these products were as follows:

| | Grams | Yield |
|---|---|---|
| Hexafluordichlorbutene | 8,440 | [1] 29.60 |
| Heptafluormonochlorbutene | 644 | [1] 2.45 |

[1] Per cent conversion of the hexachlorbutadiene.

These yields are, however, not to be considered as typical, as they do not include the products recoverable from the intermediate fraction by further fractionation, nor those which may be made from the recycled residue.

Hexachlorbutadiene can also be fluorinated to produce the same end products by reaction with antimony pentafluoride, in accordance with the following reaction:

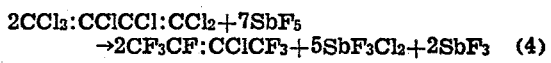

*Example II*

In an apparatus similar to that described in connection with Example I, antimony pentafluoride was added gradually to hexachlorbutadiene with agitation. The reaction was spontaneous and quite exothermic. The rate of addition of the antimony pentafluoride was regulated to maintain refluxing. The refluxing temperature reached about 70° C. The products were distilled from the reactor and fractionated as in the previous example. Analysis showed the products to be the same as those of reactions (1) and (2).

One molecule of the hexafluordichlorbutene and heptafluormonochlorbutene produced by our process can be oxidized, with elimination of the halogen attached to the secondary carbon atoms, to two molecules of identical product, thus proving that they are of the structure 1,1,1,4,4,4 hexafluor 2,3 dichlorbutene and 1,1,1,2,4,4,4 heptafluor 3 monochlorbutene respectively. To the best of our knowledge and belief, these are new chemical compounds.

These products can be further fluorinated by reaction with cobalt trifluoride in known manner as follows:

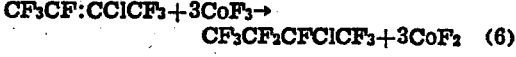

We believe the products of reactions (5) and (6), namely 1,1,1,2,3,4,4,4 octafluor 2,3 dichlorbutane and 1,1,1,2,2,3,4,4,4 nonafluor 3 monochlorbutane, to be likewise new chemical compounds.

Our products are useful as solvents and also as intermediates in organic syntheses, as well as for production of certain oxidation products, as disclosed and claimed in copending application, Serial Number 593,760, now Patent No. 2,414,706, filed simultaneously herewith.

For some purposes, such as solvents, the products obtained by our process can be used without fractionation.

Although we have described our process in one of its embodiments as exemplified by the use of antimony pentachloride as the preferred halogenation catalyst, if preferred antimony trichloride may be used at the start of the reaction, as it will become oxidized largely to the pentachloride; also in presence of free chlorine the corresponding fluorides and bromides may be used. It should also be noted that in use the antimony chloride becomes gradually converted to antimony fluorochloride, in which form it is equally serviceable.

We claim as our invention:

1. The method of fluorinating hexachlorbutadiene which comprises charging hexachlorbutadiene and a small quantity of antimony halide into a reactor; raising the temperature to between 40° and 60° C.; passing hydrogen fluoride and free chlorine slowly into the organic reagent, with agitation and refluxing; distilling off the crude product up to a temperature between 120° to 126° C.; fractionating the crude product; and collecting the fraction boiling at 66° to 68° C., corresponding to hexafluordichlor butene.

2. The method of fluorinating hexachlorbutadiene which comprises charging hexachlorbutadiene and a small quantity of antimony chloride into a reactor; raising the temperature to between 40° and 60° C.; passing hydrogen fluoride and free chlorine slowly into the organic reagent, with agitation and refluxing; distilling off the crude product up to a temperature between 120° and 126° C.; fractionating the crude product; and collecting the fraction boiling at 66° to 68° C., corresponding to hexafluordichlor butene.

3. The method of fluorinating hexachlorbutadiene which comprises charging hexachlorbutadiene and a small quantity of antimony halide into a reactor; raising the temperature to between 40° and 60° C.; passing hydrogen fluoride and free chlorine slowly into the organic reagent, with agitation and refluxing of the exit vapors at the temperature of solid carbon dioxide in alcohol; distilling off the crude product up to a temperature between 120° and 126° C., and condensing it at the temperature of solid carbon dioxide in alcohol; fractionating the crude product; and collecting the fraction boiling at 66° to 68° C., corresponding to hexafluordichlorbutene.

4. The method of fluorinating hexachlorbutadiene which comprises charging hexachlorbutadiene and a small quantity of antimony halide into a reactor; raising the temperature to between 40° and 60° C.; passing a mixture of hydrogen fluoride and free chlorine slowly into the organic reagent, with agitation and refluxing; distilling off the crude product up to a temperature between 120° and 126° C.; fractionating the crude product; and collecting the fraction boiling at 66° to 68° C., corresponding to hexafluordichlor butene.

5. The method of fluorinating hexachlorbutadiene which comprises charging hexachlorbutadiene and a small quantity of antimony halide into a reactor; raising the temperature to between 40° and 60° C.; passing hydrogen fluoride and chlorine slowly and alternatingly into the organic reagent, with agitation and refluxing; distilling off the crude product up to a temperature between 120° and 126° C.; fractionating the crude product, and collecting the fraction boiling at 66° to 68° C., corresponding to hexafluordichlor butene.

6. The method of fluorinating hexachlorbutadiene which comprises charging hexachlorbutadiene and a small quantity of antimony halide into a reactor; raising the temperature to between 40° and 60° C.; passing a mixture of hydrogen fluoride and free chlorine, in the proportions of substantially six to one, slowly into the organic reagent, with agitation and refluxing; distilling off the crude product up to a temperature between 120° and 126° C.; fractionating the crude product; and collecting the fraction boiling at 66° to 68° C., corresponding to hexafluordichlor butene.

7. As a new chemical compound, 1,1,1,4,4,4 hexafluor 2,3 dichlor butene.

CARL I. GOCHENOUR.
GLENDON D. KYKER.

REFERENCES CITED

The following references are of record in the file of this patent:

UNITED STATES PATENTS

| Number | Name | Date |
|---|---|---|
| 2,384,449 | Benning et al. | Sept. 11, 1945 |

OTHER REFERENCES

Henne et al., "Jour. Am. Chem. Soc.," vol. 65, pages 1271-2 (1943).